US012680753B2

(12) United States Patent
Bhavsar et al.

(10) Patent No.: US 12,680,753 B2
(45) Date of Patent: Jul. 14, 2026

(54) REFRIGERATOR AND CORRESPONDING WATER FILTER BRACKET

(71) Applicant: WHIRLPOOL CORPORATION, Benton Harbor, MI (US)

(72) Inventors: Yogeshkumar G. Bhavsar, Pune (IN); Luiz Afranio Alves Ferreira, Joinville (BR); Adalberto Matias Beppler, Jr., Joinville (BR); Ishan Khekale, St. Joseph, MI (US); Humberto Muñiz, García (MX); Chad Rotter, Saugatuck, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 134 days.

(21) Appl. No.: 18/610,892

(22) Filed: Mar. 20, 2024

(65) Prior Publication Data

US 2025/0297799 A1     Sep. 25, 2025

(51) Int. Cl.
*F25D 23/06* (2006.01)
*C02F 1/00* (2023.01)

(52) U.S. Cl.
CPC ............ *F25D 23/067* (2013.01); *C02F 1/003* (2013.01); *C02F 2307/12* (2013.01); *F25D 2323/121* (2013.01)

(58) Field of Classification Search
CPC .. F25D 23/067; F25D 2323/121; C02F 1/003; C02F 2307/12
See application file for complete search history.

(56) References Cited

U.S. PATENT DOCUMENTS

| | | | |
|---|---|---|---|
| 5,707,518 A * | 1/1998 | Coates | B01D 35/153 210/232 |
| 11,662,138 B2 | 5/2023 | Mercer et al. | |
| 2003/0024259 A1* | 2/2003 | Jenkins | B01D 35/30 62/389 |
| 2005/0173323 A1* | 8/2005 | Meuleners | F25D 23/126 210/282 |
| 2018/0058750 A1* | 3/2018 | Rotter | F25D 25/02 |
| 2021/0299600 A1 | 9/2021 | Lee et al. | |

FOREIGN PATENT DOCUMENTS

| | | | | |
|---|---|---|---|---|
| CN | 218442964 U | 2/2023 | | |
| WO | 2007128735 A1 | 11/2007 | | |
| WO | WO-2021045299 A1 * | 3/2021 | | F25D 17/062 |

OTHER PUBLICATIONS

Translation WO-2021045299-A1 (Year: 2021).*

* cited by examiner

*Primary Examiner* — David J Teitelbaum
(74) *Attorney, Agent, or Firm* — Brooks Kushman P.C.

(57) ABSTRACT

A refrigerator includes a liner, a water filter assembly, and a reinforcement bracket. The liner defines an internal cavity. The water filter assembly is disposed within the internal cavity. The reinforcement bracket is disposed on an opposing side of the liner relative to the water filter assembly. The reinforcement bracket includes a projection extending through the liner and engaging the water filter assembly to secure the water filter assembly to the liner within the internal cavity. The reinforcement bracket further includes a tab positioner to secure the reinforcement bracket to the liner. The reinforcement bracket further includes ribs to add stiffness to the bracket and provide a profile to form a channel to be filled with insulating material.

20 Claims, 9 Drawing Sheets

REFRIGERATOR AND CORRESPONDING WATER FILTER BRACKET

TECHNICAL FIELD

The present disclosure relates to an appliance such as a refrigerator.

BACKGROUND

Refrigerator appliances may include systems that require a water supply. Such systems may be configured to deliver water to a user via a dispensing device.

SUMMARY

A refrigerator includes a liner, a water filter assembly, and a reinforcement bracket with a projection. The liner defines an internal cavity. The water filter assembly is disposed within the internal cavity. The reinforcement bracket is disposed on an opposing side of the liner relative to the water filter assembly. The reinforcement bracket includes a projection extending through the liner and engaging the water filter assembly to secure the water filter assembly to the liner within the internal cavity.

A refrigerator includes a liner, a water filter assembly, and a reinforcement bracket with a tab positioner. The internal wall defines a refrigerated cavity within a refrigerator. The water filter assembly is disposed within the refrigerated cavity. The reinforcement bracket is disposed on an opposing side of the internal wall relative to the water filter assembly, wherein the reinforcement bracket (i) engages the water filter assembly through the internal wall to secure the water filter assembly to the internal wall within the internal cavity and (ii) includes a tab engaging the internal wall on the opposing side of the internal wall relative to the water filter assembly to position the reinforcement bracket relative to the water filter assembly.

A refrigerator includes a liner, a water filter assembly, and a reinforcement bracket with a structural rib. The liner defines an internal cavity. The water filter assembly is disposed within the internal cavity. The reinforcement bracket is disposed on an opposing side of the internal wall relative to the water filter assembly, wherein the reinforcement bracket (i) engages the water filter assembly through the internal wall to secure the water filter assembly to the liner within the internal cavity and (ii) includes a structural rib.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
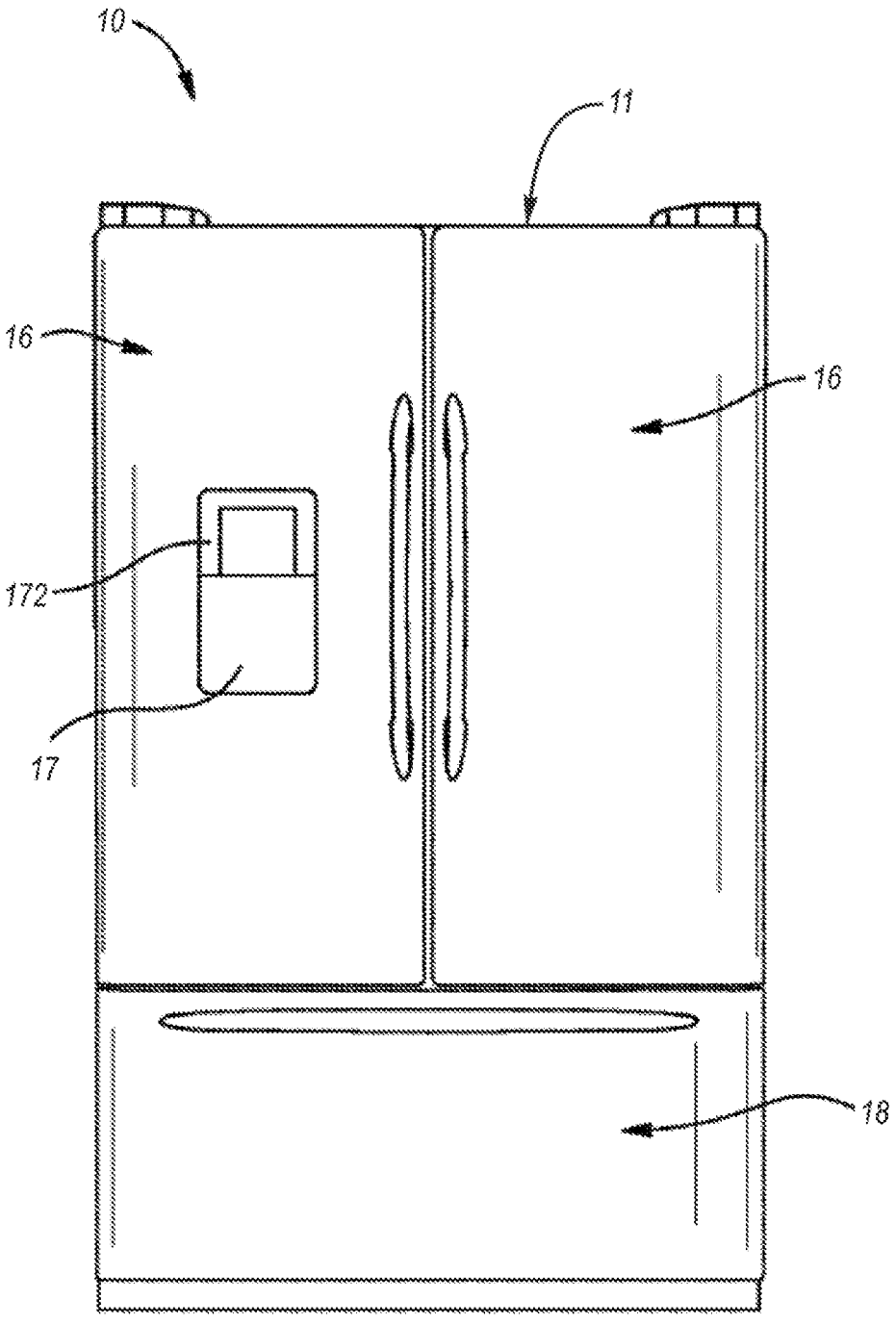
FIG. 1 is an elevated front view of a French-Door Bottom Mount type refrigerator appliance.

Referring to FIG. 1, reference numeral 10 generally designates a refrigerator with an automatic ice maker 20. As described below, an automatic ice maker is an ice maker either as a stand-alone appliance, or within another appliance such as a refrigerator, wherein the ice making process is typically induced, carried out, stopped, and the ice is harvested with substantially no user input.

Figure 2A:
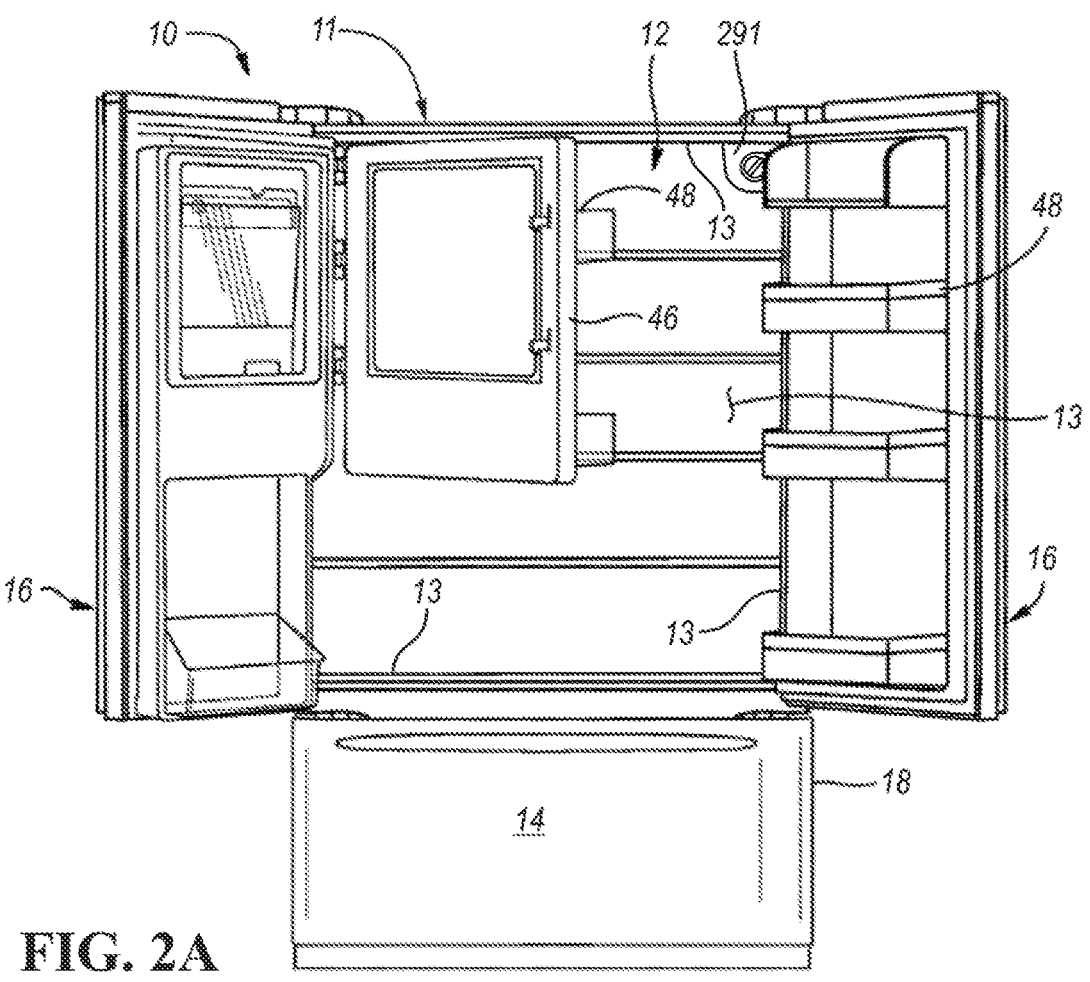
FIG. 2A is an elevated front view of a French-Door Bottom Mount type refrigerator with the refrigerator compartment doors open.
Figure 2B:
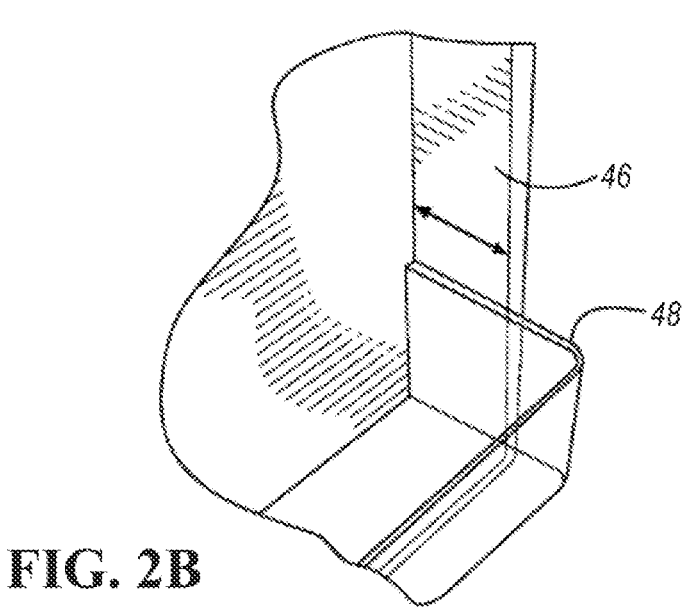
FIG. 2B is a perspective view of an aspect of an access door for the ice maker.

FIG. 1 generally shows a refrigerator 10 of the French-Door Bottom Mount type, but it is understood that this disclosure could apply to any type of refrigerator, such as a side-by-side, two-door bottom mount, or a top-mount type. As shown in FIGS. 1-2B, the refrigerator 10 may have a housing or cabinet 11 defining a first internal storage chamber, first internal cavity, or fresh food compartment 12 configured to refrigerate and not freeze consumables or foodstuffs within the fresh food compartment 12. The cabinet 11 may also define a second internal storage chamber, second internal cavity, or a freezer compartment 14 configured to freeze consumables or foodstuffs within the freezer compartment 14 during normal use. The cabinet 11 includes walls 13 that define the fresh food compartment 12 and the freezer compartment 14. The walls 13 may include both exterior panels and interior panels. The interior panels may form an inner liner. An insulating material, such as an insulating foam, may be disposed between the exterior panels and the interior panels. The refrigerator 10 may have one or more doors 16, 18 that provide selective access to the interior volume of the refrigerator 10 where consumables may be stored. As shown, the fresh food compartment doors are designated 16, and the freezer door is designated 18. It may also be shown that the fresh food compartment 12 may only have one door 16.

Figure 3:
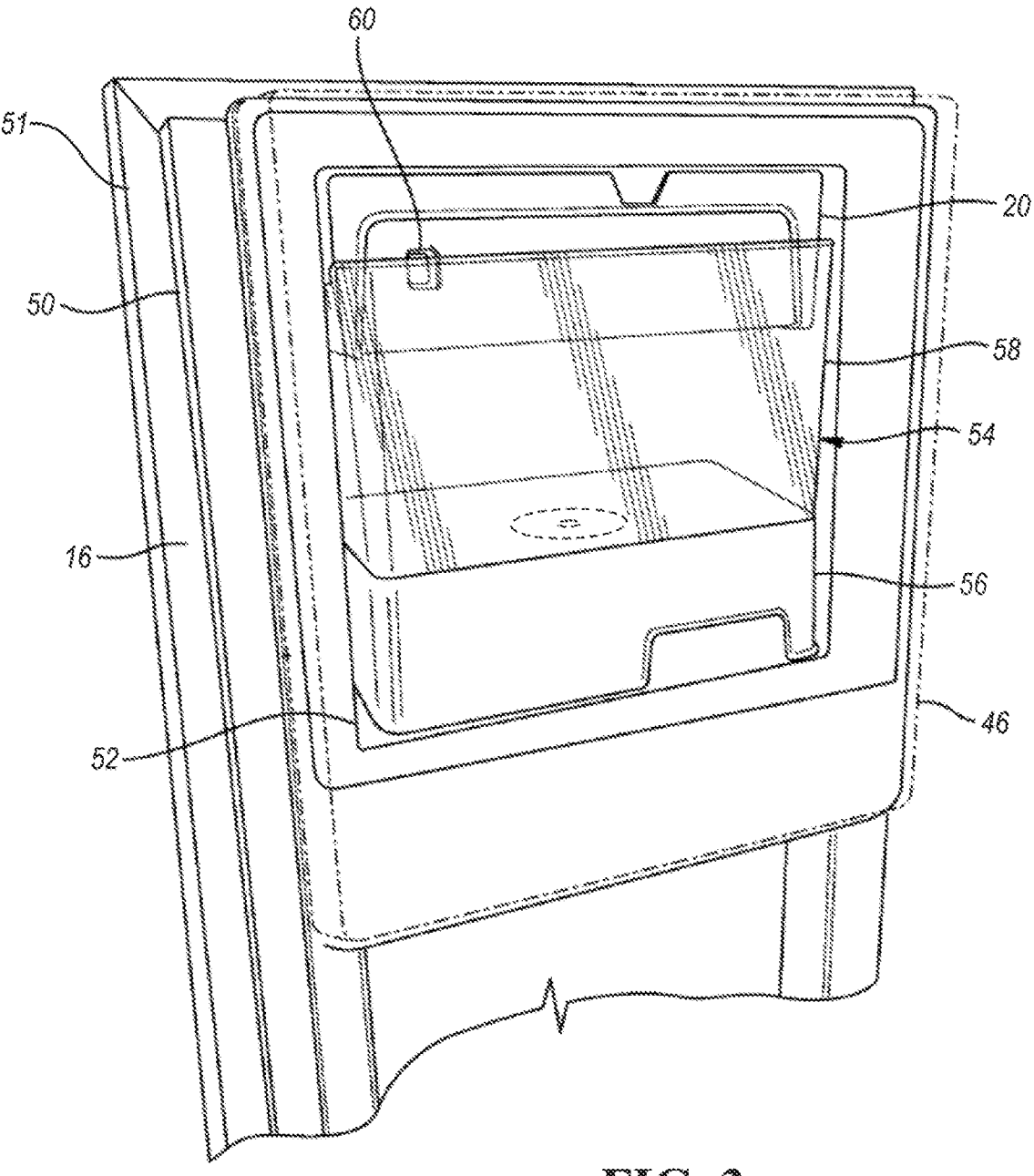
FIG. 3 is a perspective view of the interior of one door of the refrigerator compartment with the ice maker and ice container installed.

It is generally known that the freezer compartment 14 is typically kept at a temperature below the freezing point of water, and the fresh food compartment 12 is typically kept at a temperature above the freezing point of water and generally below a temperature of from about 35° F. to about 50° F., more typically below about 38° F. As shown in FIGS. 2A-3, an ice maker 20 may be located on a door 16 to the refrigerated fresh food compartment 12. The ice maker 20 may defined as an assembly of a bracket, a motor, an ice tray, a bail arm connected to the motor, at least one wire harness and at least one thermistor. The door 16 may include ice maker 20 and ice bin access door 46 hingedly connected to one of the doors 16 for the refrigerator 10 along the side proximate the hinge for the door 16 of the refrigerator 10 carrying the ice maker 20, i.e. the vertical edge closest to the cabinet. The hinge may be a single or multiple hinge(s) and may be spaced along the entire edge, substantially the entire edge, or more frequently two hinges may be used with one close to the top edge of the access door 46 and one close to the bottom edge of the access door 46.

Significantly, due at least in part to the access door 46 and the design and size of the ice maker 20, the access door 46 has a peripheral edge liner that extends outward from the surface of the access door 46 and defines a dike wall. The dike walls extend from at least the two vertical sides, more typically all four sides and define a door bin receiving volume along the surface of the access door 46. The access door 46 is selectively operable between an open position, in which the ice maker 20 and the ice storage container or bin 54 are accessible, and a closed position, in which the ice maker 20 and the ice storage bin 54 are not accessible. The access door 46 may also include door bins 48 that are able to hold smaller food items. The door bins 48 may also be located on or removably mounted to the access door 46 and at least partially spaced within the door bin receiving volume of the access door 46. While not typically the case, the ice maker 20 may also be located exterior the fresh food compartment 12, such as on top of the refrigerator cabinet, in a mullion between the fresh food compartment 12 and the freezer compartment 14, in a mullion between two fresh food compartments 12, or anywhere else an automatic, motor driven ice maker 20 may be located.

The refrigerator 10 may also have a duct or duct system (not shown) with an inlet in the freezer compartment 14 and an outlet in the fresh food compartment 12. The duct may be situated such that the length of the duct necessary to direct air from the freezer compartment 14 to the fresh food compartment 12 is minimized, reducing the amount of heat gained in the travel between the inlet and the outlet. The duct outlet located in fresh food compartment 12 may be positioned at a location near the ice maker 20. The refrigerator 10 may also have one or more fans, but typically has a single fan (not shown) located in the freezer compartment 14 to force air from the freezer compartment 14 to the fresh food compartment 12. The colder air from the freezer compartment 14 is needed in the ice maker 20 because air below the freezing point of water is needed to freeze the water that enters the ice maker 20 to freeze into ice cubes. In the embodiment shown, the ice maker 20 is located in the fresh food compartment 12, which typically holds air above the freezing point of water.

In various embodiments, where the ice maker 20 is located in a compartment or location other than in the freezer compartment 14, a fan is needed to force the air to the ice maker 20. In other embodiments, the fan or fans may be located either in the freezer compartment 14, the fresh food compartment 12, or in another location where the fan is able to force air through the duct. The ice maker 20 is often positioned within a door of the refrigerator 10 to allow for delivery of ice through the door 16 in a dispensing area 17 on the exterior of the refrigerator 10, typically at a location on the exterior below the level of the ice storage bin 54 to allow gravity to force the ice down an ice dispensing chute into the refrigerator door 16. The chute extends from the bin to the dispensing area 17 and ice is typically pushed into the chute using an electrical power-driven auger. Ice is dispensed from the ice storage bin 54 to the user of the refrigerator 10.

The refrigerator 10 may also have a water inlet that is fastened to and in fluid communication with a household water supply of potable water. Typically, the household water supply connects to a municipal water source or a well. The water inlet may be fluidly engaged with one or more of a water filter, a water reservoir, and a refrigerator water supply line. The refrigerator water supply line may include one or more nozzles and one or more valves. The refrigerator water supply line may supply water to one or more water outlets; typically one outlet for water is in the dispensing area and another to an ice tray. The refrigerator 10 may also have a control board or controller that sends electrical signals to the one or more valves when prompted by a user that water is desired or if an ice making cycle is required.

FIG. 3 shows a closer view of a door 16 with the access door 46 in hidden lines to show the ice maker 20. The door 16 may have an inner liner 50 that is secured to an outer panel 51. The door liner 50 is disposed on an internal side of the outer panel 51 and defines an ice maker receiving space 52 in which the ice maker 20 and an ice storage bin 54 of the ice maker assembly are disposed. The ice maker receiving space 52 may be referred to a cavity or receptacle that is defined by the inner liner 50 and is configured to receive the ice storage bin 54. The ice storage bin 54 may be removably positioned within the ice maker receiving space 52 (i.e., the ice storage bin 54 may be inserted into or removed from the ice maker receiving space 52). The ice maker 20 may be located at an upper portion of the ice maker receiving space 52. The ice bin 54 may be located below the ice maker 20 such that as ice is harvested, the ice maker 20 uses gravity to transfer the ice from the ice maker 20 to the ice storage bin 54. The ice storage bin 54 may comprise an ice bin base 56 and one or more ice bin walls 58 that extends upwardly from the perimeter of the ice bin base 56.

The ice maker 20 may include an on/off switch 60. The on/off switch 60 may be located on the ice maker 20 in a location that is accessible to a user without removing the ice maker 20 from the door 16 or the refrigerator 10. The ice bin wall 58 may be configured such that when the ice storage bin 54 is placed in the door 16, the on/off switch 60 is inaccessible to the user, and when the ice storage bin 54 is removed from the door 16, the on/off switch 60 is accessible to a user. The ice storage bin wall 58 may be made of a clear plastic material such as a copolyester so that a user can see the on/off switch 60 even while inaccessible when the ice bin 54 is in place. However, the front portion of the ice bin wall 58 typically extends to cover the on/off switch 60 when in the installed position to prevent inadvertent actuation of the on/off switch 60. The front portion of the ice bin wall 58 also typically extends upward to form a lip that extends around at least a portion of the ice maker 20 to further retain ice.

The ice maker 20, the door 16 (or more specifically, the portions of the door 16 that define the ice maker receiving space 52), and the ice storage bin 54 may collectively be referred to as an ice maker assembly. The door 16 (or more specifically, the portions of the door 16 that define the ice maker receiving space 52) and the ice storage bin 54 may collectively be referred to as an ice bin assembly.

Figure 4:
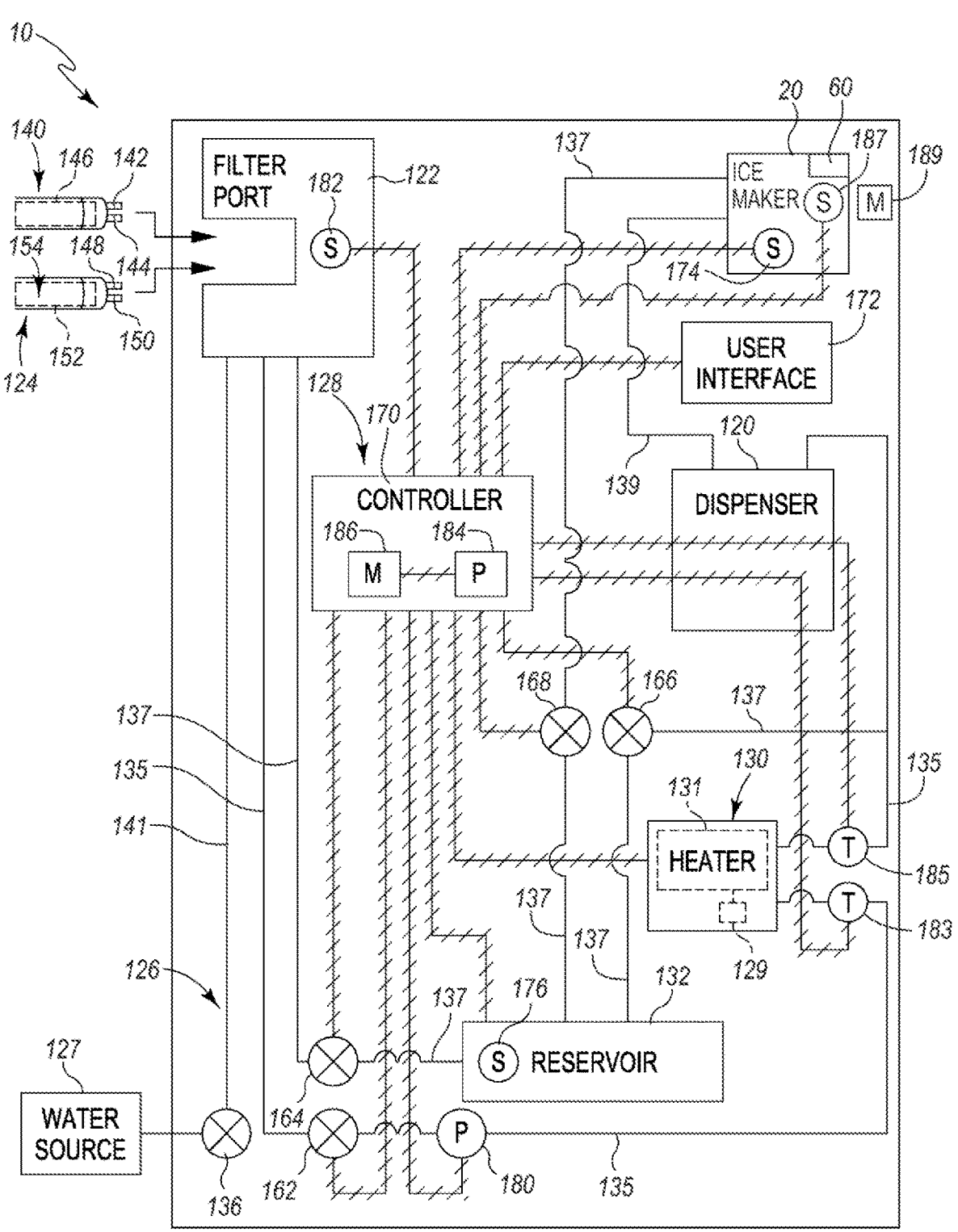
FIG. 4 is a diagrammatic view of the refrigerator appliance.

Referring now to FIG. 4, the refrigerator 10 includes a water system 126 and a control system 128 for controlling the water system 126. The water system 126 delivers or directs water from a water source 127 to the dispenser 120 which may be located in dispensing area 17. The water system 126 also delivers or directs water from the water source 127 to the ice maker 20. The control system 128 may be operable to control the various components of the water system 126 so that the dispenser 120 dispenses cold water, hot water, or ice. The control system 128 is also operable to control the water system 126 during a pre-programmed descaling cycle or other pre-programmed cycle.

The water system 126 includes a number of components for conditioning water to be discharged through the dispenser 120. In particular, the water system may have a heating assembly 130, a cold water reservoir 132, and include ice maker 20. The heating assembly 130 includes a flow-through heating element 131 and a thermal fuse 129 configured to cut power to the flow-through heating element 131 when the flow-through heating element 131 reaches a predetermined temperature. The heating assembly 130 may be positioned between the water filter port 122 and the dispenser 120 along a hot water line 135. The cold water reservoir 132 accumulates and cools water in the refrigerator 10 prior to the water being discharged through the dispenser 120 or supplied to the ice maker 20. The cold water reservoir 132 is positioned between the water filter port 122 and the dispenser 120 along a cold water line 137. The ice maker 20 receives cold water from the cold water reservoir 132 and generates ice that is discharged through the dispenser 120 via an ice line 139.

One exemplary flow-through heating element 131 is a Ferro Flow Through Heater (FTH). The flow-through heating element 131 may positioned in the refrigerator door 16 below the dispenser 120 and outside a refrigerator insulation layer. The flow-through heating element 131 is illustratively oriented in a flat orientation so that water flows in a substantially horizontal direction through the flow-through heating element 131. In some embodiments, the flow-through heating element 131 may be a thermoblock element, a microwave element, or another suitable type of heating element. Additionally, the heating element may be positioned in another location in the door 16 or the refrigerator 10 and may be placed in a number of orientations relative thereto. In alternative embodiments of the present disclosure, the flow-through heating element 131 may be replaced or augmented by a batch heating system including a heating element and a hot water reservoir.

All the water (liquid or ice) dispensed by the refrigerator 10 may pass through the water filter port 122. The water system 126 may include a main valve 136 coupled to the water source 127 and the water filter port 122 may be coupled to the main valve 136 via a water inlet line 141. The hot water line 135 and the cold water line 137 may extend from the water filter port 122 directing water through the rest of the water system 126. The main valve 136 may be manually opened or closed to selectively allow water from the water source 127 to enter the water system 126 of the refrigerator 10.

The water filter port 122 may be configured to receive a water filter cartridge 140 or the descaling cartridge 124. The water filter cartridge 140 is illustratively consumable and discarded after use. The water filter cartridge 140 includes an inlet 142, an outlet 144, and a filter media 146 as is known in the art. In other embodiments, the water filter cartridge 140, or portions thereof, may be reusable. The descaling cartridge 124 is illustratively consumable and is charged to supply enough descaling agent 154 for one descaling cycle. In other embodiments, the descaling cartridge 124 may be refillable and/or reusable.

The descaling cartridge 124 may include an inlet 148, an outlet 150, and a descaling packet 152 containing descaling agent 154. The inlet 148 may be open to the water lines of the refrigerator 10. The descaling packet 152 may be coupled to the outlet 150 and may be squeezed by water flowing into the descaling cartridge 124 so that the descaling agent 154 is dispensed through the outlet 150 into the water lines. Water ceases to flow into the descaling cartridge 124 when the descaling cartridge 124 is full of water and the descaling packet 152 is emptied. The descaling agent 154 may then be advanced through the water system 126 and reacts with the scale built up in the water system 126 so that the scale can be flushed out of the water system 126 when the reacted descaling agent 154 is discharged through the dispenser 120. In the illustrative embodiment, the descaling agent 154 is a solution with about an 8 percent concentration of acetic acid. In other embodiments, other organic acids including but not limited to sulfonic acids or carboxylic acids, in particular, lactic acid, acetic acid, formic acid, oxalic acid, uric acid solutions may be used alone or mixtures thereof. It is also possible to use inorganic acids such as phosphoric acid, hydrochloric acid or sulfamic acid solutions. Mixtures of various inorganic and organic acids could also conceivably be used as descaling agents in accordance with embodiments of the present invention.

In other embodiments, the inlet 148 and the outlet 150 may both be open to the water lines of the refrigerator 10. In such embodiments, the descaling packet 152 may be open inside the descaling cartridge 124 or opened when water enters the descaling cartridge 124 so that water flowing through the descaling cartridge is mixed with descaling agent. The water mixing with the descaling agent 154 dilutes and carries the descaling agent through the water lines of the refrigerator 10. In some such embodiments, the descaling agent 154 may be a liquid descaling agent or a solid agent.

The water system 126 further includes a number of electronically controlled valves that can be operated to supply hot or cold water to the dispenser 120 or to supply cold water to the ice maker 20. Specifically, the water system may include a hot water valve 162, a cold water valve 164, a cold water dispenser valve 166, and an ice maker valve 168. The hot water valve 162 may be coupled between the water filter port 122 and the dispenser 120 along the hot water line 135. The cold water valve 164 may be coupled between the water filter port 122 and the dispenser 120 along the cold water line 137. The cold water dispenser valve 166 may be coupled between the cold water reservoir 132 and the dispenser 120 along the cold water line 137. The ice maker valve 168 may be coupled between the cold water reservoir 132 and the ice maker 20 along the cold water line 137.

In operation, the hot water valve 162 can be opened to advance water from the water source 127 through the heating assembly 130 to the dispenser 120. The cold water valve 164 can be opened to advance water from the water source 127 to the cold water reservoir 132. The cold water dispenser valve 166 can be opened to advance cold water from the cold water reservoir 132 to the dispenser 120. The ice maker valve 168 can be opened to advance water from the cold water reservoir 132 to the ice maker 20. Otherwise, each of the valves 162, 164, 166, 168 may be biased closed to prevent water from being advanced through the water system 126.

The control system 128 of the refrigerator 10 illustratively includes a controller 170, a user interface 172, and a number of sensors 174, 176, 180, 182, 183, 185, 187. The controller 170 is configured to operate the components of the water system 126 in response to inputs from the user interface 172 and the sensors 174, 176, 180, 182, 183, 185, 187. The user interface 172 is configured to display information and to receive user inputs. The sensors 174, 176, 180, 182, 183, 185, 187 detect information and communicate information to the controller 170.

The controller 170 includes a number of electronic components commonly associated with electronic units which are utilized in the control of electromechanical systems. For example, the controller 170 may include, amongst other components customarily included in such devices, a processor such as a microprocessor 184 and a memory device 186 such as a programmable read-only memory device ("PROM") including erasable PROM's (EPROM's or EEPROM's). The memory device 186 is provided to store, amongst other things, instructions in the form of, for example, a software routine (or routines) which, when executed by the processor, allows the controller 170 to control operation of the water system 126 and other systems included in the refrigerator 10.

The user interface 172 is illustratively coupled to the controller 170 for two way communication via a signal line as shown in FIG. 4. User interface 172 may include control buttons, paddles, and indicator lights. The buttons may be pressed to receive user inputs requesting that water dispensed be cold or hot, that ice dispensed be cubed or crushed, or that pre-programmed cycles (such as the descaling cycle) be performed by the refrigerator 10. The paddles may be pressed so that the controller 170 receives inputs requesting that water or ice be discharged by the dispenser 120. The indicator lights may be used to indicate the temperature of water to be dispensed, the type of ice to be dispensed, the status of the water filter cartridge 140, the need for a descaling cycle, the availability of one or more functions of the refrigerator 10, or other information. In some embodiments, the user interface 172 may include a graphic display, a touch screen, or other interface operable to display information and to receive user inputs.

The controller 170 is electrically coupled to each of the sensors 174, 176, 180, 182, 183, 185, 187 to receive inputs from each of the sensors 174, 176, 180, 182, 183, 185, 187 as shown in FIG. 4. In particular, the sensors 174, 176, 180, 182, 183, 185, 187 may include an ice level sensor 174, a reservoir sensor 176, temperature sensors 183, 185, a pressure sensor 180, a filter port sensor 182, and a sensor 187 to detect the presence of the ice storage bin 54 in the ice maker receiving space 52. The ice level sensor 174 is coupled to the controller 170 via a signal line and is configured to detect if the ice storage bin 54 is full. The reservoir sensor 176 is coupled to the controller 170 via a signal line and is configured to detect if the cold water reservoir 132 is full or the water level in the cold water reservoir 132. In the illustrative embodiment, water discharged through the dispenser 120 after being heated in the heating assembly 130 may be between 175-185° F., and may be typically be about 180° F. In other embodiments, water discharged through the dispenser 120 after being heated in the heating assembly 130 may be hotter or cooler. The pressure sensor 180 is coupled to the controller 170 via a signal line and is configured to detect back pressure applied to the heating assembly 130 through the hot water valve 162. In some embodiments, the hot water valve 162 may be configured to regulate the pressure being supplied to the heater assembly 130. The filter port sensor 182 is coupled to the controller 170 via a signal line and is configured to detect the presence of the water filter cartridge 140 or the descaling cartridge 124. The temperature sensors 183, 185 are coupled to the controller 170 via signal lines and are configured to monitor the temperature of water entering and exiting the heating assembly 130. If the temperature difference between the sensors 183, 185 across the heating assembly 130 is determined by the controller 170 to be outside a predetermined range, the controller 170 may disable the heating assembly 130.

Sensor 187 is coupled to the controller 170 via a signal line and is configured to detect the presence or absence of a magnet 189. The presence of the magnet 189 is indicative that the ice storage bin 54 is properly positioned in the ice maker receiving space 52 to receive ice produced by the ice maker 20. The absence of the magnet 189 is indicative that the ice storage bin 54 is not positioned, or is not properly positioned, in the ice maker receiving space 52 to receive ice produced by the ice maker 20. The sensor 187 may communicate the presence or absence of the magnet 189 to the controller 170. The controller 170 may be programmed to, in response to the sensor 187 detecting the presence of the magnet 189, initiate or allow the production of ice via the ice maker 20. The controller 170 may also be programmed to, in response to the sensor 187 detecting the absence of the magnet 189 (e.g., the sensor 187 not detecting the magnet 189), prevent the ice maker 20 from the producing of ice. The sensor 187 may be a reed switch that is configured to close a circuit when the magnetic field of the magnet 189 is detected and to open the circuit when no magnetic field is detected, or vice versa.

Additionally, the controller 170 is electrically coupled to the electrically controlled valves 162, 164, 166, 168 and the heating assembly 130 as shown in FIG. 4. Specifically, the cold water valve 164 is coupled to the controller 170 via a signal line so that the controller 170 can direct the cold water valve 164 to open or close. The hot water valve 162 is coupled to the controller 170 via a signal line so that the controller 170 can direct the hot water valve 162 to open or close. The ice maker valve 168 is coupled to the controller 170 via a signal line so that the controller 170 can direct the ice maker valve 168 to open or close. The cold water dispenser valve 166 is coupled to the controller 170 via a signal line so that the controller 170 can direct the cold water dispense valve 166 to open or close. The heating assembly 130 is coupled to the controller 170 via a signal line so that the controller 170 can direct the heating assembly 130 to activate or deactivate the flow-through heating element 131.

Hence, the control system 128 including the controller 170 may be operated to control operation of the refrigerator 10. In particular, the controller 170 executes a routine including, among other things, a control scheme in which the controller 170 monitors outputs of the sensors 180, 185 in order to inform a user of detected scale build-up and to control the availability of hot water when water system 126 contains built up scale. To do so, the controller 170 communicates with the sensors 180, 185 in order to determine, among other things, if the water system 126, (and more particularly, if the components of the hot water line 135 that conducts water for the hot water function) is likely to contain a predetermined amount of scale build-up as indicated by an elevated temperature or pressure of water flowing through the dispenser 120. In some embodiments, the controller may communicate with both temperature sensors 183, 185 and compare the temperature rise across the heating assembly 130 to determine scale build up. Armed with this data, the controller 170 determines if a descaling cycle is desirable and if continued operation of the hot water function is allowable. Once it is determined if a descaling cycle is found to be desirable, the controller 170 can direct the user interface 172 to display a request for a user to initiate the descaling cycle. If the controller 170 determines that the continued operation of the hot water function is not allow-able, the controller 170 can disable the water system 126 from providing hot water to the dispenser 120.

Figure 5:
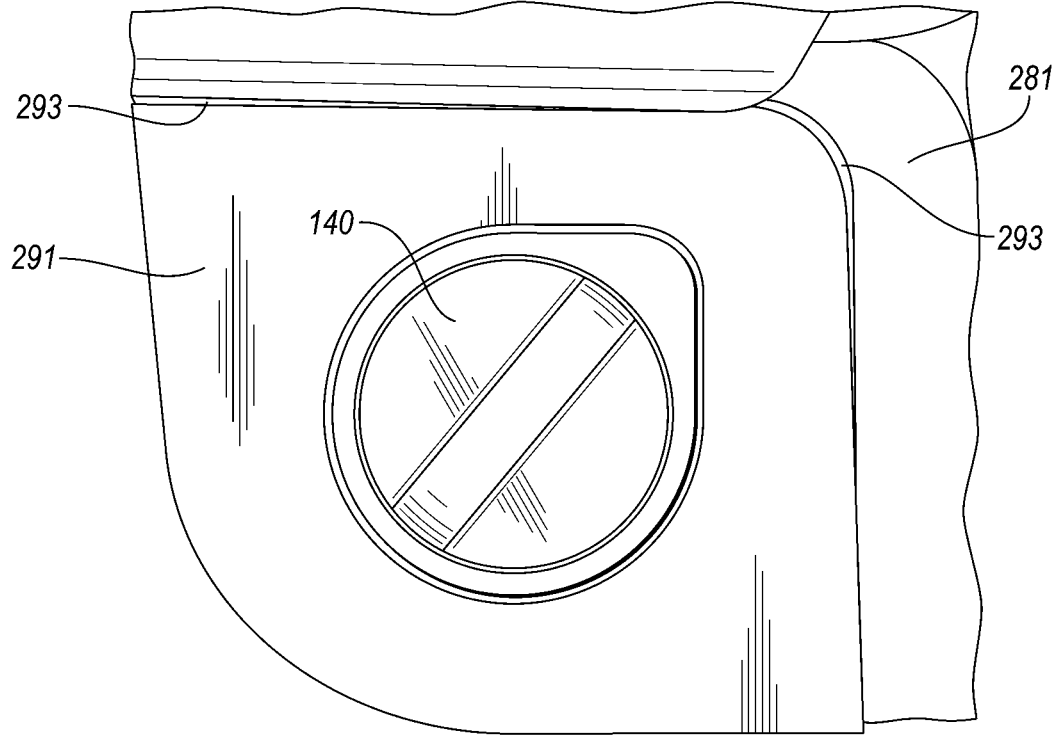
FIG. 5 is a front view of a water filter assembly illustrating gaps between the water filter assembly and a refrigerator liner.
Figure 6:
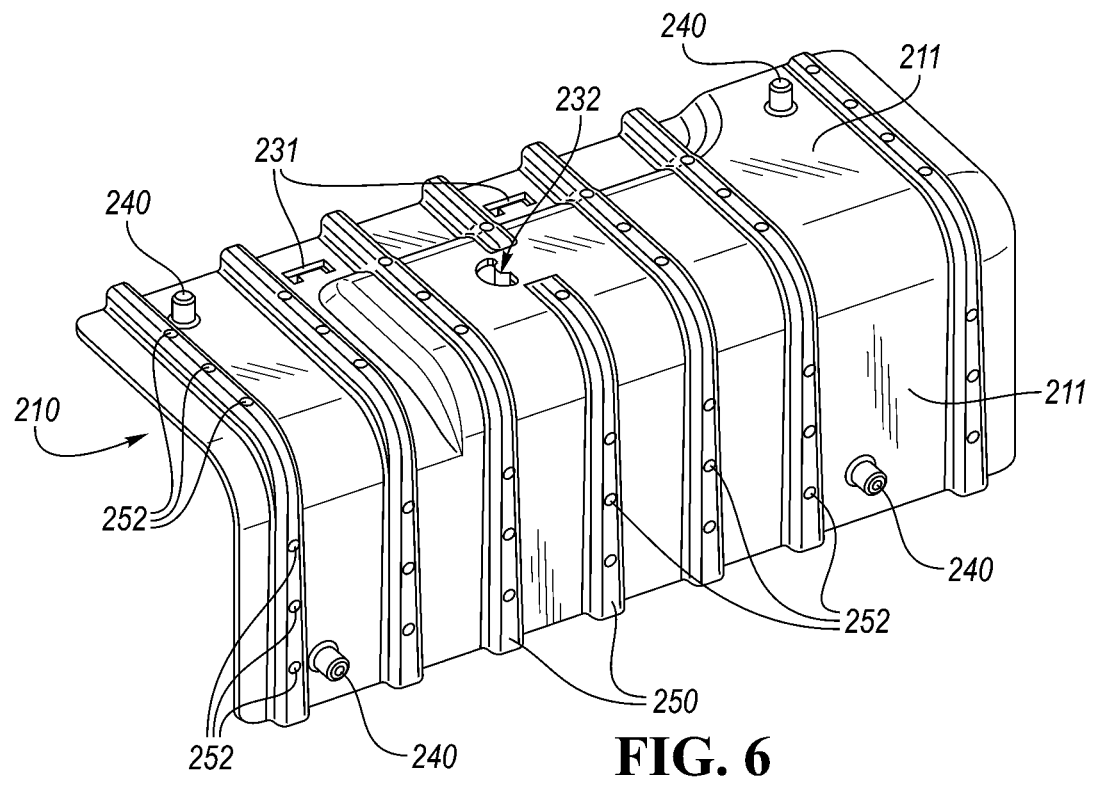
FIG. 6 is a perspective view of the exterior portion of a reinforcement bracket.
Figure 7:
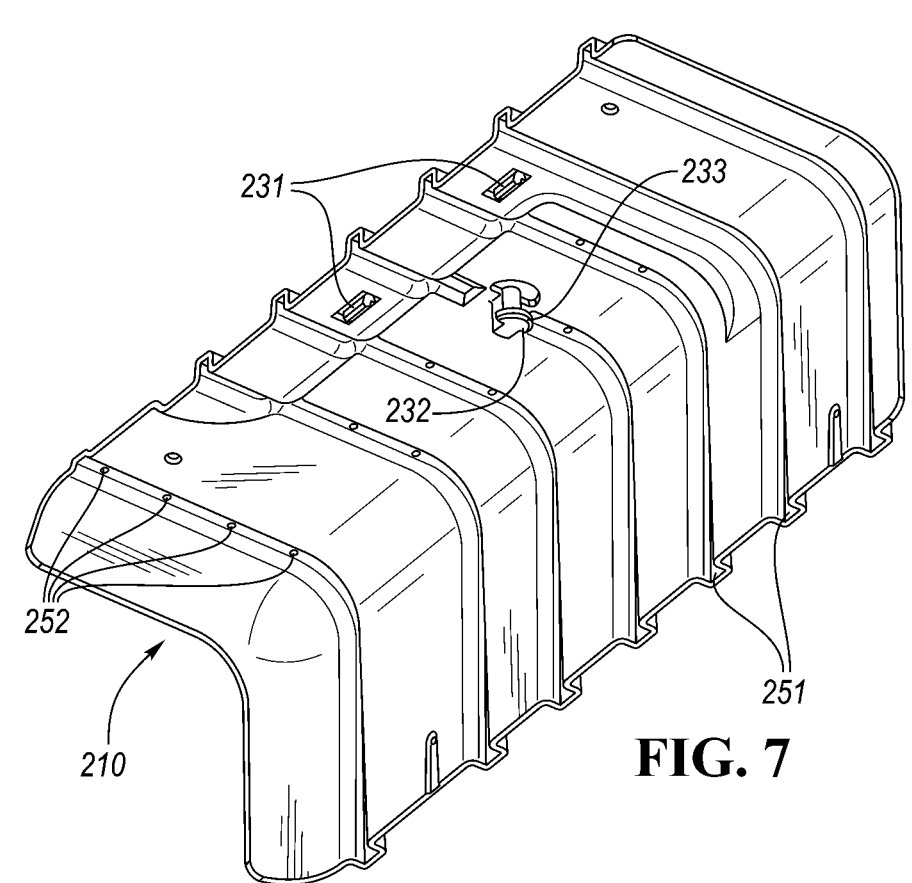
FIG. 7 is a perspective view of the interior portion of the reinforcement bracket.
Figure 8:
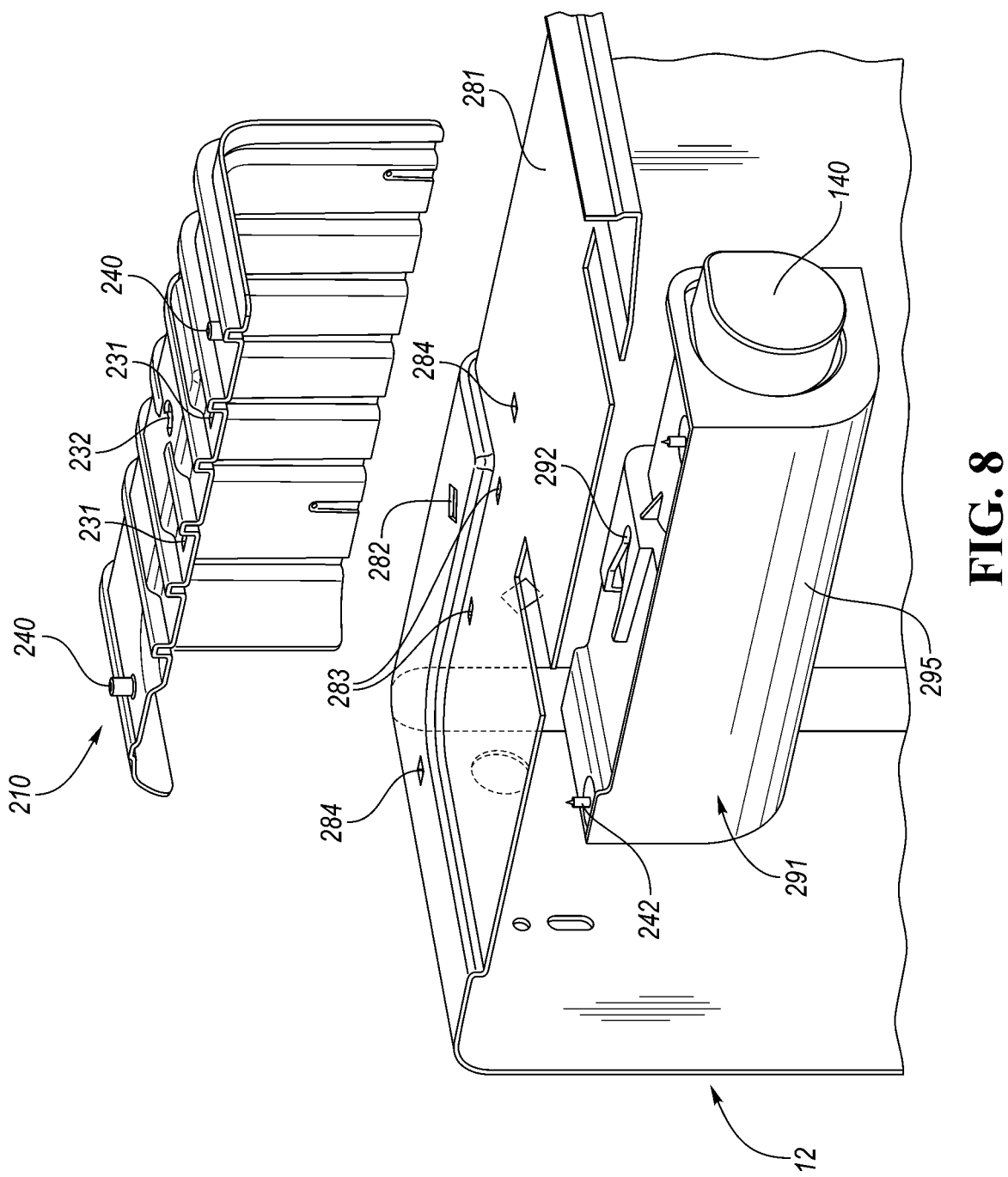
FIG. 8 is an exploded view of the reinforcement bracket, the refrigerator liner, and water filter assembly.
Figure 9:
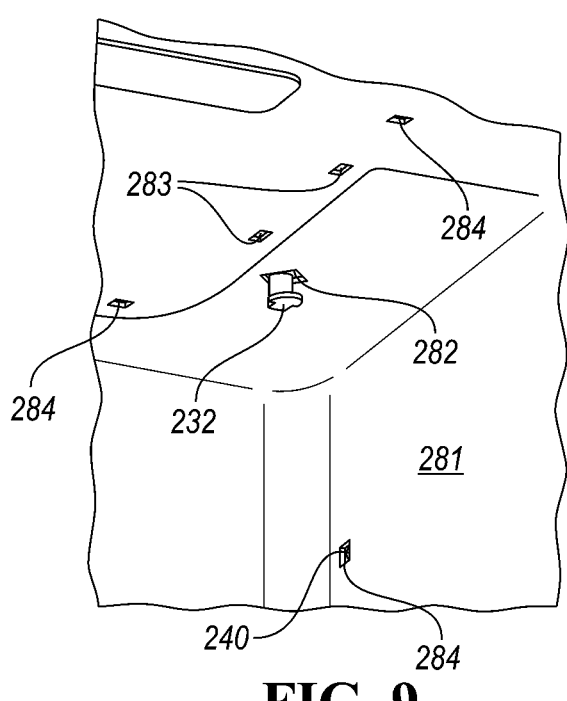
FIG. 9 is perspective view of the interior portion of the inner wall with the reinforcement bracket in place and prior to the attachment of the water filter assembly.

Referring now to FIG. 5, the water filter assembly 291 is attached to the inner liner 281 in at least one location (e.g., along a top wall 13 and a side wall 13 that form the inner liner). The water filter assembly 291 may include all or a portion of the water filter port 122 and water filter 140 seen in FIG. 4. The inner liner 281 defines an internal cavity of the fresh food compartment 12. The water filter assembly 291 is located below and adjacent to the inner liner 281. It is observed that attaching the water filter assembly 291 to the inner liner 281 in two planes can lead to a gap or gaps 293 forming between the two components. The resulting gap or gaps 293 reduce usable space in the fresh food compartment, offer potential surface area for condensation, and present unpleasant aesthetics.

Referring now to FIGS. 6-9, a reinforcement bracket 210 reduces the formation of a gap or gaps 293 between the water filter assembly 291 and the inner liner 281. The bracket 210 integrates the connection components for the water filter assembly 291 and the inner liner 281 into a single device, thus ensuring good dimensional stability and reducing the risk of a misaligned assembly.

The reinforcement bracket 210 may comprise an L-shaped profile with at least one plate 211 to engage the inner liner 281 of the fresh food compartment 12. It includes a plurality of fastening anchors 240, one or more tabs 231, and a projection 232 with a tongue 233, all to facilitate engagement of the water filter assembly 291 and the inner liner 281. The reinforcement bracket 210 has a plurality of fastening anchors 240 configured to engage fasteners 242 extending from the water filter assembly 291 and through the inner liner 281 to secure the water filter assembly 291 to the reinforcement bracket 210. In addition, the reinforcement bracket 210 has one or more structural ribs 250 to increase the stiffness of the bracket 210. The structural ribs 250 may each define a channel 251 along an interior of the bracket 210 and a series of orifices 252 configured to facilitate injection of and/or the ingress of insulating material from an exterior of the bracket 210 and into the channels 251. The structural ribs 250 may be located on one or both plates 211 of the reinforcement bracket 210.

The reinforcement bracket 210 is disposed on an opposing side of the inner liner 281 relative to the water filter assembly 291. The reinforcement bracket 210 includes a projection 232 with a tongue 233. The inner liner 281 defines a projection orifice 282. The projection 232 and tongue 233 extend through the projection orifice 282. The projection 232 extends in a direction such that it extends through the liner 281 from the exterior to the interior of the liner 281 to engage the water filter assembly 291 in order to secure the water filter assembly 291 to the liner 281. The tongue 233 is configured such that it engages a slot 292 defined by water filter assembly 291.

The reinforcement bracket 210 has one or more tabs 231 configured to engage the inner liner 281 on the opposing side of the inner liner 281 relative to the water filter assembly 291 to position the reinforcement bracket 210 relative to the water filter assembly 291 and to locate the water filter assembly 291 in a desired position along the inner liner 281. The inner liner 281 defines recessed regions or a set of tab orifices 283. The one or more tabs 231 are configured to engage the recessed regions or tab orifices 283 to locate the bracket 210 in a desired position along the exterior of the inner liner 281. A recessed region may be defined to include a detent, an opening, a hole, a slot, a slit, a depression, and a notch.

The plurality of fastening anchors 240 on the reinforcement bracket 210 are configured to receive distal ends of a fasteners 242 to enable firm attachment between the water filter assembly 291 and the internal side of the inner liner 281, and between the reinforcement bracket 210 and the external side of the inner liner 281. During assembly, an installer inserts the distal end of the fastener 242 in an outward-facing direction through the water filter assembly 291, through a recessed region or orifice 284 defined by the inner liner 281, and into the fastener anchor 240 of the reinforcement bracket 210. A cover 295 of the water filter assembly 291 may be removed to provide access to the heads of the fasteners 242 during installation of the water filter assembly 291 so that a tool may be utilized to engage the heads of the fasteners 29. A fastener is defined to include a threaded device, a screw, a bolt, a pin, a rivet, and any other fastener known in the art.

The one or more structural ribs 250 increase the stiffness of the bracket. In addition, the structural rib defines the channels 251 along C-shaped cross-sectional profiles. While this embodiment illustrates C-shaped cross-sectional profiles, this profile is non-limiting, and can include other channel profiles such as a V-shape, D-shape, U-shape, and various paths such as serpentine, continuous, and non-continuous. The channels 251 are disposed between the ribs 250 and the exterior side of the internal wall 281. The channel 251 are configured to be filled with an insulating material (not shown) such as polyurethane. The structural ribs 250 include a series of orifices 252 configured to facilitate the ingress of insulating material during manufacturing. The insulating material can adhere the reinforcement bracket 210 to the liner 281 in addition to providing insulation.

The water filter cartridge 140 is located within an opening defined by the water filter assembly 291. The slot 292 is formed on an outer and raised portion of the water filter assembly 291. The slot 292 is V-shaped and designed to engage with the tongue 233 of the projection 232. In this embodiment, the slot 292 is V-shaped but is not intended to be limiting. In alternative embodiments, the slot 292 shape can be U-shaped and rectilinear-shaped. The combination of the V-shaped slot 292 on the water filter assembly 291, the tongue 233 and projection 232 of the reinforcement bracket 210 simplify and improve the assembly process since the water filter assembly 291 can only be installed in one direction.

The reinforcement bracket 210 is placed on the exterior portion of the inner liner 281. A plurality of recessed regions or orifices 282, 283, 284 defined by the inner liner 281 align with and engage the tabs 231, the projection 232, and the fastening anchors 240. The fastening anchor orifices regions 284 are aligned with the fastening anchors 240. The projection 232 is seen extended through inner liner 281 and via the projection orifice 282. The projection 232 is in place and ready to engage the water filter assembly slot 292 of the water filter assembly 291.

Figure 10:
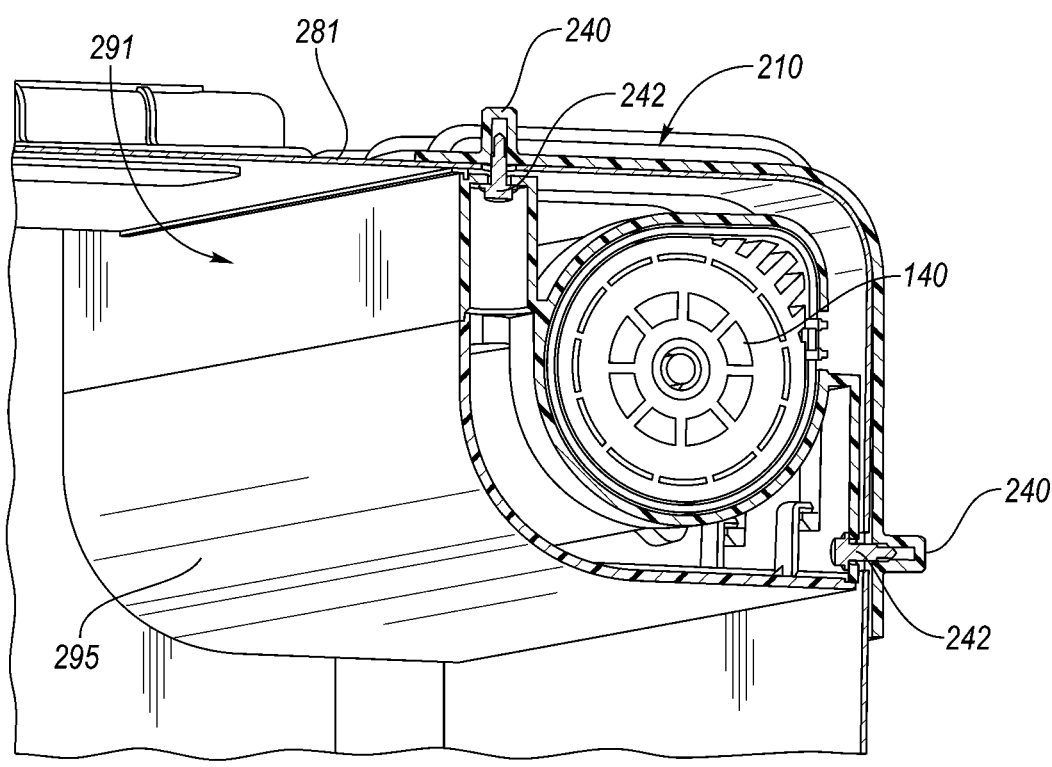
FIG. 10 is a perspective and cross-sectional view of the reinforcement bracket, the refrigerator inner liner, and the water filter assembly with a water filter cartridge.
Figure 11:
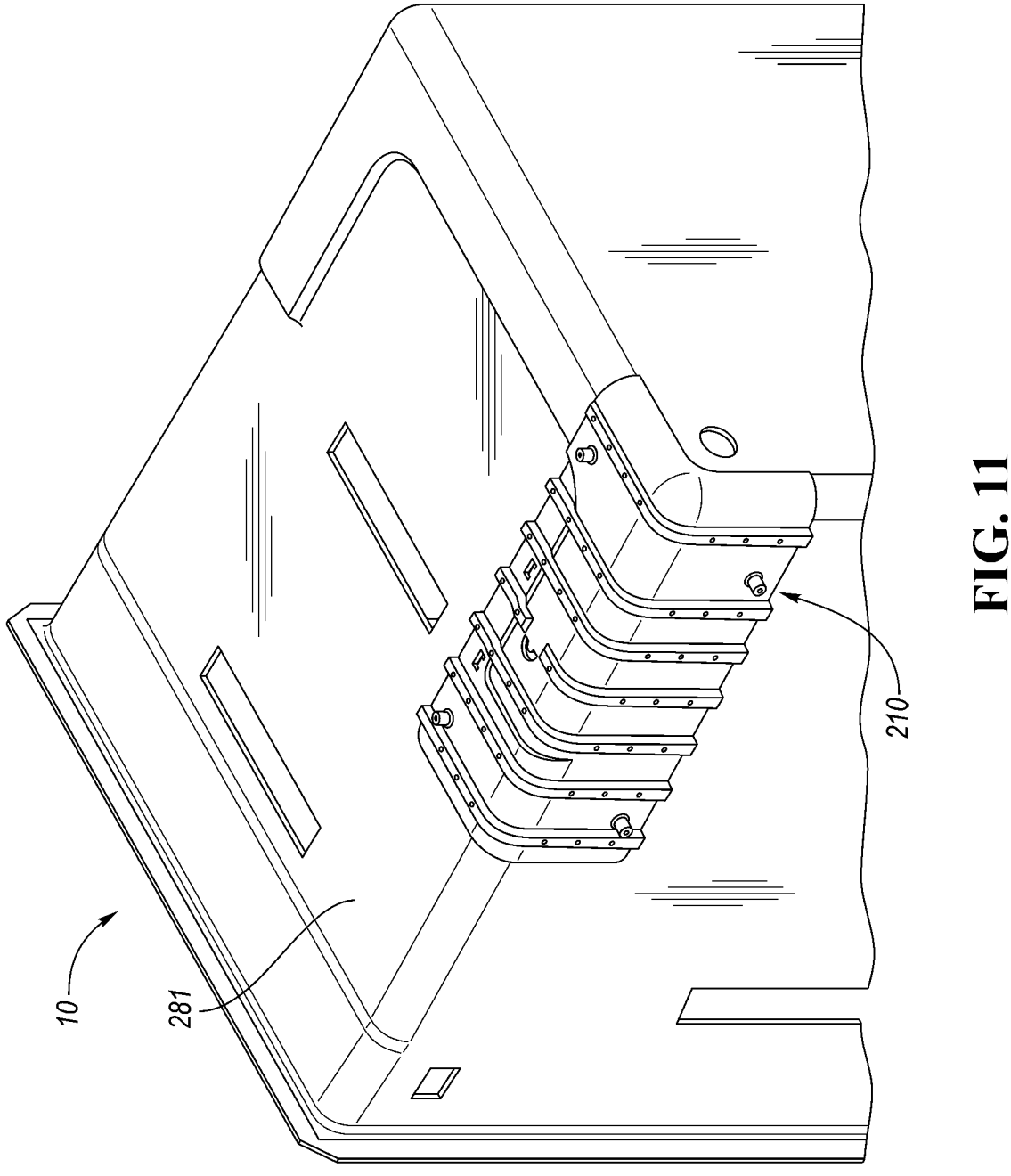
FIG. 11 is perspective view of the reinforcement bracket in its assembled form.

Referring now to FIGS. 10 and 11, the reinforcement bracket 210 is illustrated as assembled on to the inner liner 281 and connected to the water filter assembly 291. An installer places the reinforcement bracket 210 in alignment with the plurality of recessed regions or orifices 282, 283, 284 defined by the inner liner 281 with the projection 232 extending through the projection orifice 282. The installer next engages the water filter assembly 291 with the tongue 233 of the projection 232 via the V-shaped slot 292. In FIG. 10, the installer inserts fasteners 242 through the water filter assembly 291, through the inner liner 281, and secures the fasteners 242 to the fastening anchors 240 of the reinforcement bracket 210. In FIG. 11, the reinforcement bracket 210 is secured to the internal wall 281 and to the water filter assembly 291 (not shown).

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A refrigerator comprising:
a liner defining an internal cavity;
a water filter assembly disposed within the internal cavity; and
a reinforcement bracket disposed on an opposing side of the liner relative to the water filter assembly, the reinforcement bracket including first and second plates collectively having an L-shaped profile and a projection extending the first plate, wherein the first and second plates engage a top wall of the liner and a side wall of the liner, respectively, along an exterior of the liner, and the projection extends through the top wall and engages the water filter assembly along an interior of the liner to secure the water filter assembly to the liner within the internal cavity.

2. The refrigerator of claim 1, wherein the projection extends through the liner along a downward direction and has a tongue extending transversely to the downward direction, wherein the tongue is configured to engage the water filter assembly.

3. The refrigerator of claim 2, wherein (i) the water filter assembly defines a slot and (ii) the tongue is configured to engage the water filter assembly within the slot.

4. The refrigerator of claim 1, wherein the reinforcement bracket includes a tab engaging the liner on the opposing side of the liner relative to the water filter assembly to position the reinforcement bracket relative to the water filter assembly.

5. The refrigerator of claim 1, wherein the first and second plates each include fastening anchors configured to engage fasteners to secure the reinforcement bracket to the liner.

6. The refrigerator of claim 1, wherein the reinforcement bracket includes structural ribs, and wherein each of the structural ribs extends along the first plate, from the first plate to the second plate, and along the second plate.

7. The refrigerator of claim 6, wherein the structural ribs project from an exterior of the reinforcement bracket, the structural ribs define channels along an interior of the reinforcement bracket, the channels are disposed between the ribs and the liner, and the channels are configured to receive an insulating material.

8. A refrigerator comprising:
internal walls defining a refrigerated cavity;
a water filter disposed within the refrigerated cavity; and
a reinforcement bracket disposed on an opposing side of the internal walls relative to the water filter, the reinforcement bracket including first and second plates collectively having an L-shaped profile and a tab extending from the first plate, wherein the first and second plates engage a first of the internal walls and a second of the internal walls, respectively, on the opposing side of the internal walls relative to the water filter, the reinforcement bracket engages the water filter through the first of the internal walls to secure the water filter to the internal walls within the refrigerated cavity, and the tab extends from the first plate and engages the first of the internal walls on the opposing side of the internal walls relative to the water filter to position the reinforcement bracket relative to the water filter.

9. The refrigerator of claim 8, wherein the reinforcement bracket includes a projection extending from the first plate and through the first of the internal walls, wherein the projection engages the water filter to secure the water filter to the internal walls within the refrigerated cavity.

10. The refrigerator of claim 9, wherein the projection extends through the first of the internal walls along a direction and has a tongue extending transversely to the direction, wherein the tongue is configured to engage the water filter.

11. The refrigerator of claim 10, wherein (i) the water filter defines a slot and (ii) the tongue is configured to engage the water filter within the slot.

12. The refrigerator of claim 8, wherein the reinforcement bracket includes structural ribs, and wherein each of the structural ribs extends along the first plate, from the first plate to the second plate, and along the second plate.

13. The refrigerator of claim 12, wherein the structural ribs project from an exterior of the reinforcement bracket, the structural ribs define channels along an interior of the reinforcement bracket, the channels are disposed between the ribs and the internal walls, and the channels are configured to receive an insulating material.

14. A refrigerator comprising
internal walls defining a refrigerated cavity;
a water filter disposed within the refrigerated cavity; and
a reinforcement bracket disposed on an opposing side of the internal walls relative to the water filter, the reinforcement bracket including first and second plates collectively having an L-shaped profile, wherein the first and second plates engage a first of the internal walls and a second of the internal walls respectively, on the opposing side of the internal walls relative to the water filter, the reinforcement bracket engages the water filter through the first of the internal walls to secure the water filter to the internal walls within the refrigerated cavity.

15. The refrigerator of claim 14, wherein the reinforcement bracket includes a structural rib projecting from an exterior of the reinforcement bracket, the structural rib defines a channel along an interior of the reinforcement bracket, the channel is disposed between the structural rib and the internal walls, and the channel is configured to receive an insulating material.

16. The refrigerator of claim 15, wherein the structural rib defines a series of orifices extending from the exterior of the reinforcement bracket to the channel, wherein the orifices facilitate injection of the insulating material into the channel.

17. The refrigerator of claim 14, wherein the reinforcement bracket includes a projection extending from the first plate and through the first of the internal walls along a direction, the projection engages the water filter to secure the water filter to the internal walls, the projection has a tongue extending transversely to the direction, and the tongue is configured to engage the water filter.

18. The refrigerator of claim 17, wherein (i) the water filter defines a slot and (ii) the tongue is configured to engage the water filter within the slot.

19. The refrigerator of claim 14, wherein the first and second plates each include fastening anchors configured to engage fasteners to secure the reinforcement bracket to the internal walls.

20. The refrigerator of claim 14, wherein the reinforcement bracket includes a tab engaging the first of the internal walls on the opposing side of the internal walls relative to the water filter to position the reinforcement bracket relative to the water filter.

* * * * *